Jan. 25, 1966
H. MAECKER ETAL  3,230,693
APPARATUS FOR MASS SEPARATION OF REACTIVE GASES
Filed June 22, 1962
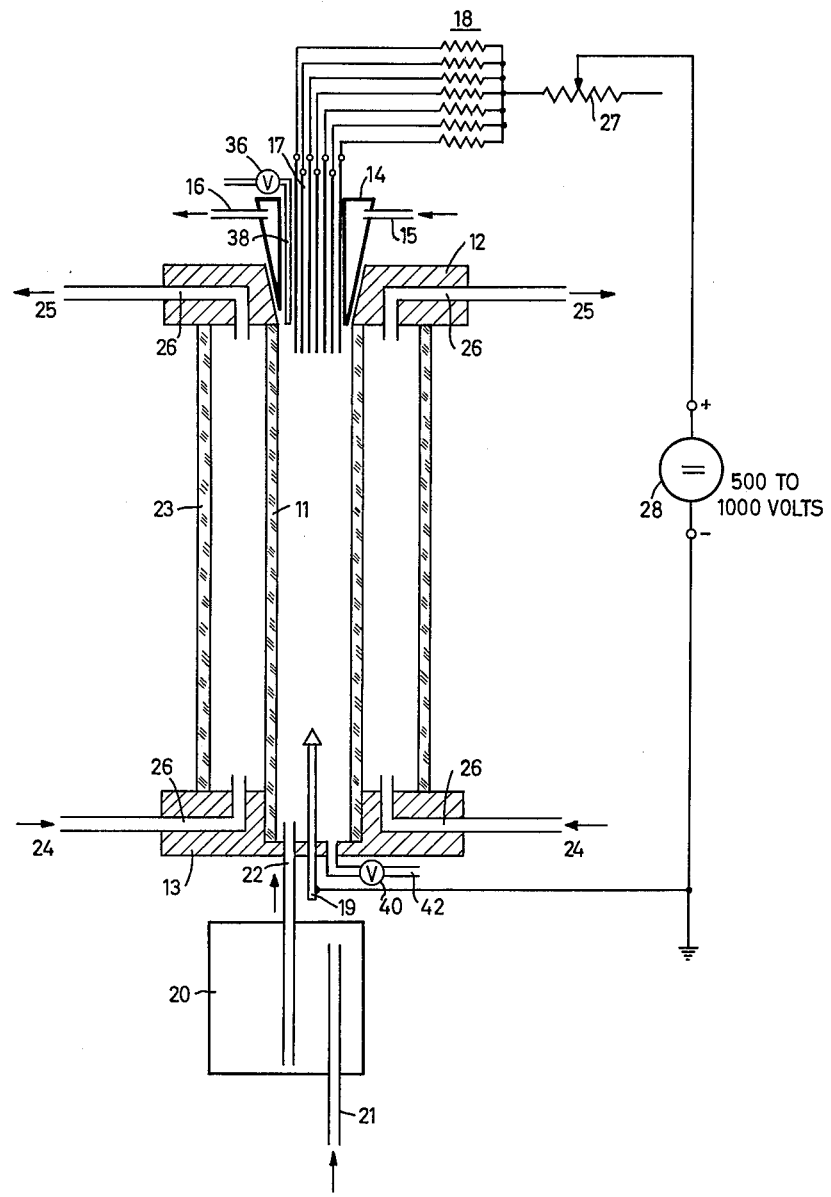

United States Patent Office 3,230,693
Patented Jan. 25, 1966

3,230,693
APPARATUS FOR MASS SEPARATION OF
REACTIVE GASES
Heinz Maecker and Wolfgang Frie, Erlangen, Germany, assignors to Siemens-Schuckertwerke Aktiengesellschaft, Berlin-Siemensstadt, Germany, a corporation of Germany
Filed June 22, 1962, Ser. No. 204,508
Claims priority, application Germany, June 29, 1961, S 74,558
5 Claims. (Cl. 55—209)

Our invention relates to an apparatus for the mass separation of mixed gases having different atomic constituents, at least one gaseous component of the mixture being of the reactive type rather than a noble gas.

Known apparatus utilize diffusion phenomena for separating the components of a mixture of gases having respectively different diffusion coefficients. In general, the separating action of these apparatus is very limited. For that reason they are employed only where chemical separating methods fail. This is the case, for example, in the separation of isotope atoms of one and the same element.

G. Hertz (Zeitschrift für Physik, vol. 79, 1932, page 108; vol. 91, 1934, page 810) has described several devices suitable for operation at low gas pressures. A favorable overall separation is obtained by a cascade-type connection of a number of separating members, for example a series of porous clay tubes, and by suitably conducting a circulating gaseous mixture through the cascade.

A different apparatus therefor has been described by Clusius and Dickel (Naturwissenschaften, vol. 26, 1938, page 546; Zeitschrift für Physikalische Chemie, part B, vol. 44, 1939, pages 371, 451). Their apparatus is not based upon the difference between the normal diffusion coefficients of the individual gas components but upon "thermo-diffusion." The gas mixture to be separated is contained in a vertical tube of several meters length in whose axis an electrically heated wire is arranged. The hotter region near the axis becomes enriched with the lighter gas component, the colder marginal range with the heavier component. Due to convection the lighter, hotter component rises along the heating wire, and the heavier and colder component descends along the tube wall. As a result, a gradual separation of the gas components is obtained to a relatively great extent.

A separating method has been described by K. Clusius, E. Schumacher and A. Fischer (Zeitschrift für Physikalische Chemie, Neue Folge, vol. 15, 1958, pages 14 to 21). According to this method the electrical heater wire, or the hot wall, in a separator tube of usual design, is replaced by the discharge path of an arc energized by alternating current of high voltage. Axially inserted into the respective ends of the separator tube are iron electrodes of 2 mm. thickness. The separator tube is cooled by tetrachlorethane to prevent flash-over discharges. The current intensity in the discharge path can be increased up to 28 milliamps. The arc is ignited as a glow discharge at low gas pressure. Employed are separator tubes of one meter length and inner diameters of various dimensions. The separation with this method also comes about by thermal diffusion. Separating action has been shown for mixtures of argon-nitrogen and neon isotopes. According to a modification of the method, the arc is operated with direct current. Separation in this manner has been shown for mixtures of noble gases such as Ne-X, but not for the separation of xenon isotopes. As far as the separation of isotopes with an alternating-current arc is concerned, the separation comes about by the different ionization voltages, and the different recombination rates of the isotope hydrogen atoms, augmented by the plasma flows. The method is limited to gases and vapors.

It is an object of our invention to provide a diffusion apparatus for mass separation of different gases from a mixture that affords a considerable increase in separating action beyond that heretofore attained.

We have discovered, according to our invention, that such improvement, with respect to a mixture of reactive gases of different constituents in a separator tube is obtained, if the temperature of the hotter zone, located axially in the interior of a diffusion tube, is made so high that dissociation of the constituent gas molecules into ions occurs in the gaseous components, thus converting the gas in the inner, hottest zone of the tube predominantly or substantially entirely into a plasma, whereas the surrounding zone along the inner wall of the separator tubes remains at a lower temperature. The term "mixture of reactive gases of different constituents" is understood herein to mean plural-atomic molecules of noble gases such as Ne-X, molecules of other than noble gases, for example HD, NO or mixtures of a reactive gas with a non-reactive (noble) gas, for example He-$N_2$, Ne-Hg.

In accordance with the present invention, a diffusion apparatus for mass separation of mixed gases having different constituents comprises a separator tube having spaced apart opposite first and second ends and an elongated peripheral wall. The ends and the wall of the separator tube enclose an inner elongated substantially axial central zone. A first means is constructed and arranged for maintaining a space enclosed by the separator tube at a slight pressure above atmospheric pressure. A second means is constructed and arranged for supplying mixed gases to the interior of the second end of the separator tube. Electric heating-arc discharge-plasma generating third means is constructed and arranged in the inner central zone for dissociating one of the mixed gases. The third means includes an anode-arc discharge-electrode and is disposed substantially axially of the tube at one of the first and second ends of the tube and a cathode-arc discharge-electrode is disposed substantially axially at the other of the first and second ends of the tube. The anode electrode includes a plurality of separate parallel spaced apart elongated substantially coextensive members connected in parallel electrical circuit relationship with each other and a plurality of resistors, each of the resistors being connected in series with a corresponding one of the elongated members. A source of electric voltage is operatively connected to the third means to energize the third means. The source of electric voltage has a voltage of a value sufficient to create an electrical potential difference between the anode and cathode, the potential difference being sufficient to create a plasma in the central zone and to heat the gas mixture to a temperature sufficient to dissociate the molecules of one of the gases. Variable resistor fourth means is constructed and arranged in series electrical relationship with the anode for controlling the electrical potential difference between the anode and cathode. Fifth means is constructed and arranged for cooling substantially the entire peripheral wall of the tube. Sixth means is constructed and arranged for withdrawing gas enriched with the molecularly dissociated one of the gases from the second end of the separator tube. Seventh means is constructed and arranged for withdrawing gas depleted in the molecularly dissociated one of the gases from the first end of the separator tube.

The apparatus according to the invention will be further explained with reference to an embodiment according to the invention illustrated by way of example in the accompanying drawing showing the apparatus schematically by a vertical section.

A tube 11 of quartz of quartz glass having a length of 50 cm. and an inner diameter of about 15 mm., serves as separator tube and is vertically held at its upper and lower ends in respective metal plates 12 and 13. The metal plate 12 has a central bore of conical shape for receiving a water-cooled anode holder 14 which is provided with an inlet nipple 15 and an outlet nipple 16 for cooling water. The anode holder 14 carries seven individual electrodes 17 consisting of vertical tungsten rods which are spaced and insulated from each other and which jointly form the anode. Each individual electrode is connected in series with a corresponding one of resistors 18 of about 5 ohm. The anode electrode includes the members 17 and the resistors 18. The electrode-resistor circuits are all connected in parallel relation to one another. The lower ends of the tungsten rods are ground to planar shape. The rod diameter is about 1 mm. The anode holder 14 preferably forms an outlet 38 which is controlled with a pressure-limiting valve 36, the latter also being a part of the anode holder.

The lower metal plate 13 has a central bore for receiving the lower end of the quartz tube 11. This lower bore extends from above almost, but not entirely, through the plate 13 and is slightly larger in diameter than the quartz tube 11. An electrode 19 to act as the cathode passes through a smaller central opening upwardly into the tube 11. The cathode 19 consists of a tungsten rod of about 3 mm. diameter and is pointed at the top. The cathode can be adjusted by displacing it vertically. A second pressure-limiting valve 40 controls flow of gas from a second outlet 42 from the tube 11, which outlet passes through the portion of the plate 13 covering the lower end of tube 11.

The gaseous mixture is supplied to the separating tube 11 through an equalizing vessel 20 which receives the mixture through an inlet pipe 21 and issues the mixture to the separator tube 11 through an outlet pipe 22. The separator tube 11 is cooled by water which circulates about the tube in the interior of a glass cylinder 23 surrounding the tube. The cooling water is supplied through pipes 24 and ducts 26 in the bottom plate 13 and leaves the cooling space through ducts 26 in the top plate 12 and outlet pipes 25.

The anode rods 17 are jointly connected through a controllable resistor 27 with the positive pole of a direct-voltage source 28 furnishing a high voltage of from 500 to 1000 volts. The high voltage is preferably supplied through a rectifier (not illustrated) from an alternating-current power supply line. The cathode 19 and the negative pole of the voltage source are grounded. The parallel connection of the individual anode rods 17 serves to prevent overloading the rods, as would occur when using only one anode rod.

The apparatus according to the invention will be described presently with reference to the example of mass separation concerning the gas mixture A-N$_2$.

The separator tube 11 is first supplied with the gas mixture A-N$_2$ through the equalizing vessel 20. Then the arc is ignited by bridging the arc gap with the aid of a tungsten rod. For this purpose the tungsten rod is passed through the conical anode holder 14 and brought into contact with the tip of the cathode 19. The tungsten rod is at the same potential as the individual anode rods 17. Thereafter the tungsten rod is pulled in the direction of the anode rod. As a result, an arc is formed between the cathode 19 and the tungsten rod. When the tungsten rod is pulled above the lower ends of the anode rods 17, the arc jumps over to the anode rods. A slight pressure above the ambient atmospheric pressure is maintained in the separator tube 11 in order subsequently to cause the separated gases to pass out of the tube. The current in the arc discharge, after the arc has been established between the anode rods and the cathode, is increased to about 40 amperes, by correspondingly adjusting the control resistor 27. As a result, a steep temperature gradient is developed in the plasma from the axis toward the outside. The ratio of the argon to the nitrogen proportion in the above-mentioned gas mixture may be about 5:1.

Under these conditions the temperature in the interior of the plasma near the axis of the separator tube is about 10,000° C., whereas the temperature in the separator tube near the wall is only 200 to 300° C. on account of the water cooling. The temperature in the interior of the plasma is sufficient when a complete dissociation of the nitrogen molecules into ionized nitrogen atoms takes place. A visible indication of the fact that the dissociation temperature is reached is constituted by the appearance of a blue-white core in the interior of the plasma which can be observed through the glass cylinder 23 and the quartz tube 11. Due to the dissociation process the number of nitrogen corpuscles in the interior of the plasma becomes doubled in comparison with the surrounding outer range of lower temperature within the separator tube. As a result, a partial pressure gradient of nitrogen is developed so that the nitrogen corpuscles diffuse from the hotter into the colder zone of the plasma; that is, the nitrogen corpuscles migrate from the inner zone of the separator tube toward its wall. This diffusion process causes enrichment of argon and depletion of nitrogen in the interior of the plasma. Due to the high temperature in the interior of the plasma, the argon has lower density than the nitrogen in the outer zone of the plasma, so that the argon corpuscles in the hot zone will rise. The greater density of the nitrogen in the outer, colder zone, however, causes the nitrogen corpuscles to sink toward the bottom.

As a result, the apparatus according to the invention achieves a higher degree of separating action as compared with the known apparatus according to Clusius.

When the method and apparatus of the present invention are applied to the separation of gas mixtures that contain oxygen or halogens, it is of advantage to replace the metallic electrodes with carbon electrodes.

It will be understood by those skilled in the art that with respect to details not essential to the invention proper, various modifications are applicable, for example in accordance with the literature cited above, and hence that the invention can be given a variety of embodiments other than particularly illustrated and described herein, without departing from the essential features of the invention and within the scope of the claims annexed hereto.

We claim:

1. A diffusion apparatus for mass separation of mixed gases having different constituents, comprising
a separator tube having spaced apart opposite first and second ends and an elongated peripheral wall, said ends and said wall enclosing an inner elongated substantially axial central zone;
first means constructed and arranged for maintaining a space enclosed by said separator tube at a slight pressure above atmospheric pressure;
second means constructed and arranged for supplying mixed gases to the interior of the second end of said separator tube;
electric heating-arc discharge-plasma generating third means constructed and arranged in said inner central zone for dissociating one of the mixed gases, said third means including an anode-arc discharge-electrode disposed substantially axially of said tube at one of said first and second ends of said tube and a cathode-arc discharge-electrode disposed substantially axially at the other of said first and second ends of said tube, said anode electrode including a plurality of separate parallel spaced apart elongated substantially coextensive members connected in parallel electrical circuit relationship with each other and a plurality of resistors, each of said resistors being connected in series with a corresponding one of said elongated members;

a source of electric voltage operatively connected to said third means to energize said third means, said source of electric voltage having a voltage of a value sufficient to create an electrical potential difference between said anode and cathode, said potential difference being sufficient to create a plasma in said central zone and to heat the gas mixture to a temperature sufficient to dissociate the molecules of one of said gases;

variable resistor fourth means constructed and arranged in series electrical relationship with said anode for controlling said electrical potential difference between said anode and cathode;

fifth means constructed and arranged for cooling substantially the entire peripheral wall of said tube;

sixth means constructed and arranged for withdrawing gas enriched with said molecularly dissociated one of said gases from the second end of said separator tube; and seventh means constructed and arranged for withdrawing gas depleted in said molecularly dissociated one of said gases from the first end of said separator tube.

2. A diffusion apparatus as claimed in claim 1, further comprising anode cooling means constructed and arranged for cooling said anode electrode.

3. A diffusion apparatus as claimed in claim 1, wherein said second means includes pressure equalizing means for equalizing the pressure of gases supplied to said separator tube.

4. A diffusion apparatus as claimed in claim 1, wherein said separator tube comprises transparent material.

5. A diffusion apparatus as claimed in claim 1, wherein said separator tube comprises transparent material and wherein said fifth means for cooling the peripheral wall of said tube comprises a coaxial tube of transparent material surrounding the said tube.

References Cited by the Examiner

UNITED STATES PATENTS

| | | | |
|---|---|---|---|
| 1,007,683 | 11/1911 | Ellis | 55—5 X |
| 1,056,026 | 3/1913 | Hoofnagle | 55—6 X |
| 1,056,045 | 3/1913 | Murray | 55—5 X |
| 2,258,594 | 10/1941 | Brewer et al. | 55—81 |
| 2,533,966 | 12/1950 | Simmons | 55—66 X |
| 2,578,558 | 12/1951 | Klemperer | 55—139 |
| 2,722,284 | 11/1955 | Cooperman | 55—139 |
| 2,763,125 | 9/1956 | Kadosch et al. | |
| 2,791,332 | 5/1957 | Henke et al. | 210—72 |
| 2,836,750 | 5/1958 | Weimer | 313—231 X |
| 2,868,317 | 1/1959 | Maas et al. | 55—102 |
| 2,986,641 | 5/1961 | Michels | 55—158 X |
| 3,004,158 | 10/1961 | Steimel | 55—3 X |
| 3,089,082 | 5/1963 | Little | 55—105 X |
| 3,113,427 | 12/1963 | Meyer | 315—111 X |
| 3,116,433 | 12/1963 | Moncrieff-Yeates. | |

FOREIGN PATENTS

| | | |
|---|---|---|
| 358,086 | 9/1931 | Great Britain. |
| 611,068 | 10/1948 | Great Britain. |
| 682,392 | 11/1952 | Great Britain. |
| 873,565 | 7/1961 | Great Britain. |

HARRY B. THORNTON, *Primary Examiner.*

ROBERT F. BURNETT, *Examiner.*

D. TALBERT, *Assistant Examiner.*